United States Patent Office 3,491,607
Patented Jan. 27, 1970

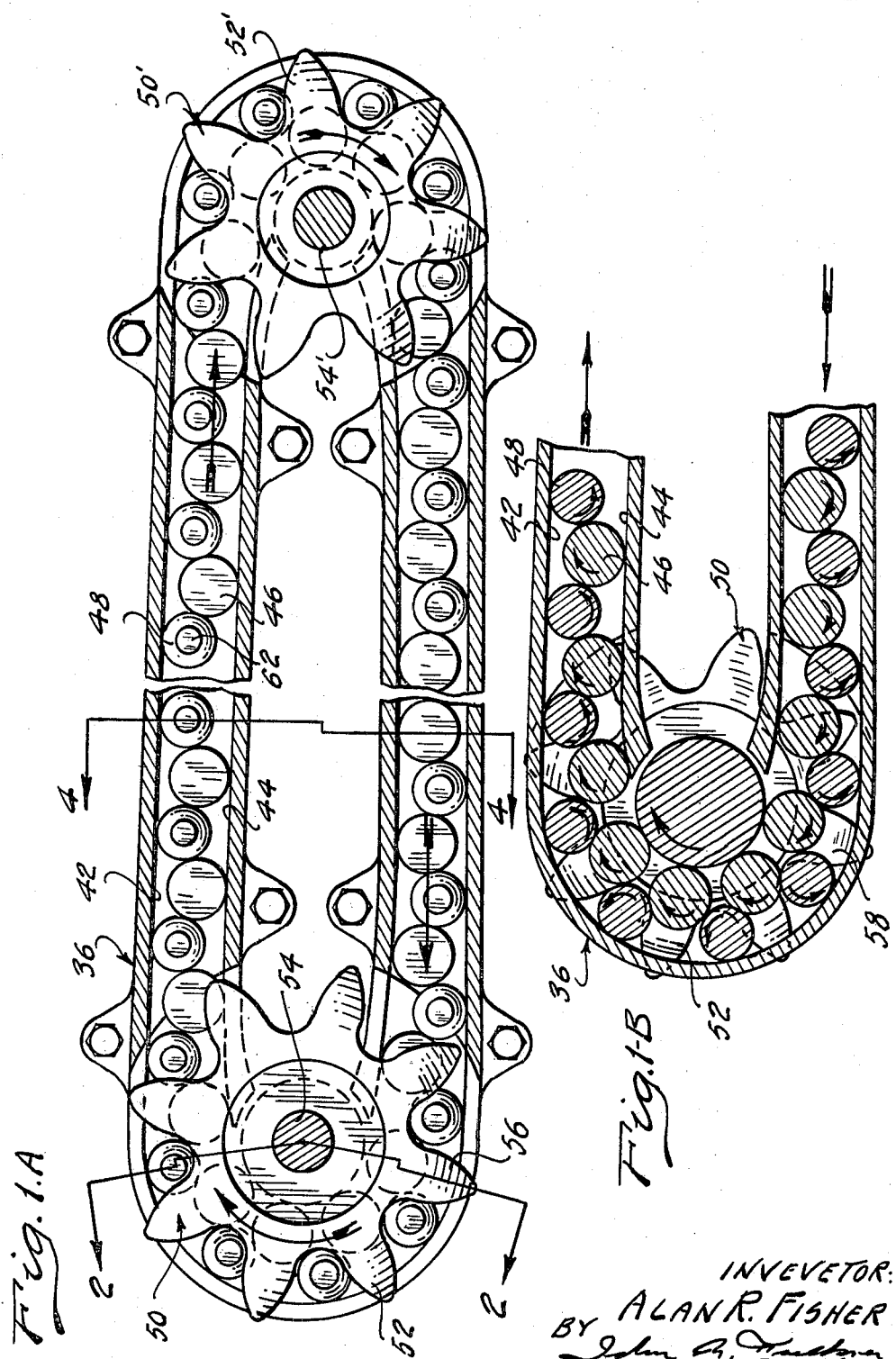

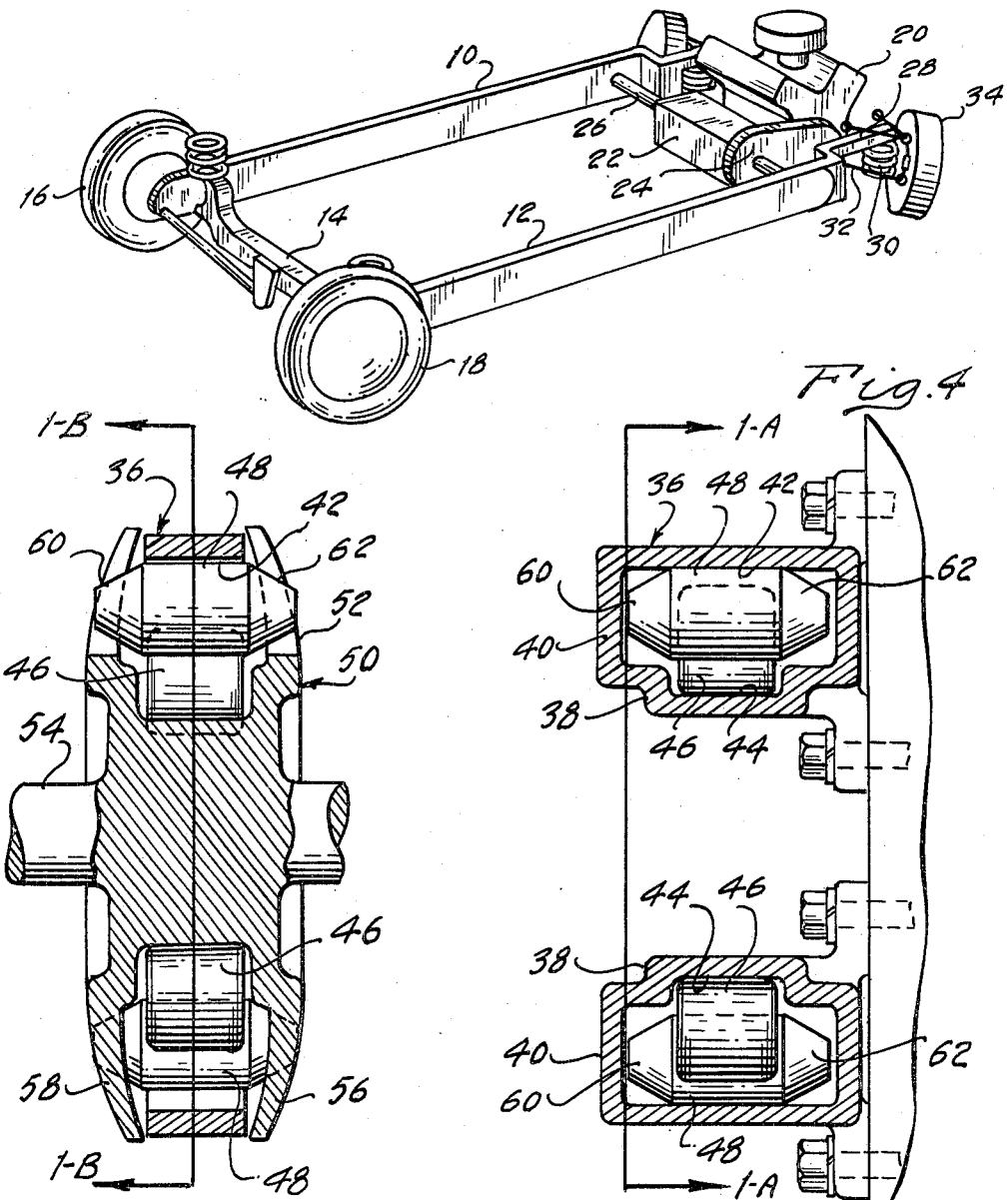

3,491,607
COUNTER-ROTATING ROLLER DRIVE
Alan R. Fisher, Highland Park, Mich., assignor to Ford Motor Company, Dearborn, Mich., a corporation of Delaware
Filed Nov. 29, 1968, Ser. No. 779,924
Int. Cl. F16h 7/06
U.S. Cl. 74—216.3
6 Claims

ABSTRACT OF THE DISCLOSURE

A torque transfer drive mechanism comprising a pair of sprockets, one being driven and the other acting as the driver, and a series of counter-rotating rollers drivably connecting the sprockets.

GENERAL DESCRIPTION OF THE INVENTION

My invention is capable of delivering power from a driving shaft to a driven shaft which are located on parallel axes. One shaft carries a driving sprocket and the other shaft carries a driven sprocket. A driving connection between the shafts is established by pairs of rollers arranged in series between the teeth of the sprockets. The rollers are guided by a cage or chute, and rolling action is established between the individual rollers and the walls of the chute.

In a preferred form of my invention each of the pairs of rollers of the series includes a relatively large roller engageable with the radially inward wall of the chute and a smaller roller engageable with the radially outward wall of the chute. The smaller roller is formed with a greater axial width than the corresponding width of the large diameter roller.

At one end of the recirculating circuit established by the rollers there is located a driving sprocket with involute teeth. The teeth are adapted to register with the longer, smaller diameter rollers, but they do not register with the large diameter rollers.

The sprockets are formed with axially spaced tooth portions that straddle the larger diameter rollers and engage drivably the smaller diameter rollers. Because of the selective action of the involute teeth of the sprocket, a relatively pure rolling action is established between the rollers and the sides of the teeth thereby reducing substantially the friction that otherwise would occur.

A sprocket of similar construction is located at the other end of the recirculating circuit for the rollers, and again a pure rolling action is established between the sprocket teeth and the smaller diameter rollers.

I am aware of various positive-drive, motion-transmitting devices that employ counter-rotating elements. These elements usually are in the form of balls, rather than rollers, which are arranged in a guide-way or track in registry with the keys or teeth of a sprocket or drive-wheel. In such prior art mechanisms the drive sprocket and the counter-rotating elements create a relatively high degree of friction thereby making such drives impractical for use in an automotive driveline or in other applications which require a high degree of mechanical efficiency.

It is an object of this invention to overcome the undesirable friction inherent in roller drives of the prior art mechanisms by providing a power input sprocket and a power output sprocket that are adapted to register with alternate rollers in the series rather than with each roller so that the direction of rotation of the roller with respect to the guideway is compatible with the character of the involute rolling action of the rollers with respect to involute teeth of the sprockets.

BRIEF DESCRIPTION OF THE FIGURES OF THE DRAWINGS

FIGURE 1A is a longitudinal cross-section along section line 1A—1A of FIGURE 4 showing a roller drive assembly including a driving sprocket and companion roller elements.

FIGURE 1B is a longitudinal cross-section along section line 1B—1B of FIGURE 2 showing a portion of the FIGURE 1A structure.

FIGURE 2 is a cross-sectional assembly view taken along the plane of section line 2—2 of FIGURE 1A.

FIGURE 3 shows in schematic form a torque transfer drive in an automotive vehicle driveline installation embodying the improvements of my invention.

FIGURE 4 is a cross-sectional view taken along the plane of section line 4—4 of FIGURE 1.

PARTICULAR DESCRIPTION OF THE INVENTION

I have shown in FIGURES 1A through 4 in schematic form a torque transfer drive capable of being used in an automotive vehicle driveline. FIGURE 3 shows, for example, an unsprung part of a vehicle chassis comprising suspension arms 10 and 12. These are connected together by a cross member 14 to form a unitary assembly. Road wheels 16 and 18 are mounted at the rearward end of the arms.

The vehicle engine is shown at 20, and it is mounted in a transverse direction with the axis of the crankshaft perpendicular to the fore-and-aft axis of the vehicle.

Numeral 22 shows schematically a multiple ratio power transmission mechanism, the input shaft for which can be connected to the crankshaft for engine 20 through a torque transfer drive 24. This drive may comprise the sprockets and roller elements of my invention. The engine and transmission, which can be bolted together as a unitary assembly, can be pivoted on a suspension shaft 26. Forward extensions 28 of arms 10 and 12 may serve as a part of the dirigible wheel suspension. It may be engaged by suspension spring 30 situated between extension 28 and a suspension arm 32 for the dirigible wheel 34.

Torque can be transmitted also between the output shaft for transmission 22 and the traction wheels 18 and 16 through a roller drive embodying the features of the torque transfer drive 24. In this case, however, the guideways or chutes for the roller elements of the drive form the suspension arms 10 and 12. The driven sprocket in this instance would be located at the rear of the vehicle, and would be mounted for rotation about the axis of the traction wheels 16 and 18.

In FIGURE 1A and in FIGURE 4 the chute or guideway identified generally by reference character 36 includes a lower channel section 38 and an upper channel section 40. A radially outward channel wall 42 is formed in the channel section 40. A corresponding radially inward wall 44 is formed in the channel section 38. By preference the channel sections 38 and 40 can be formed as a unitary, continuous guide-way.

Large diameter rollers 46 are situated in the channel section 38, and smaller diameter rollers 48 are situated in the channel section 40. The axial width of the rollers 48 is greater than the width of rollers 46 although the diameter of the rollers 48 is smaller than the diameter of the rollers 46. One roller 48 is situated between two adjacent rollers 46, as indicated in FIGURE 1A. All of the rollers are in rolling contact with each other and the rollers 48 are adapted to roll against surface 42 while the rollers 46 are adapted to roll against the surface 44.

Mounted at one end of the circuit for the rollers 48 and 46 is a drive sprocket shown generally at 50. It includes involute teeth 52 and the hub which is mounted on drive shaft 54. The teeth 52 are bipartite in form as indicated in FIGURE 2. Each tooth 52, for example, comprises a tooth side 56 and a companion tooth side 58 which extend through a slotted opening formed in the channel section 40 of the guide-way 36. They extend also through a slot formed in the wall of the channel section 38.

Rollers 46 are adapted to be straddled by the tooth portions 56 and 58. The tooth portions 56 and 58 are formed with involute profiles which engage smaller diameter rollers 48, one portion 56 engaging one end of the roller 48 and the other tooth portion 58 engaging the other end. These roller ends are tapered, as indicated in FIGURE 4 at 60 and 62, to increase the degree of pure rolling contact between the involute profiles for the sprocket teeth and the rollers themselves.

The driven sprocket is shown in FIGURE 1A, at 50'. Its form resembles the form of the sprocket shown at 50. It also is formed with involute teeth that can be formed with either the same diameter or a different diameter depending upon whether a torque multiplication is desired or whether a direct drive 1:1 drive ratio is desired.

The drive sprocket 50 will impart a rolling action to the smaller rollers as it is driven. This produces a pure rolling engagement between the involute profiles of the teeth and the ends 62 and 60 of the rollers. The smaller rollers in turn impart a rolling action to the larger rollers. A pure rolling action is estabilshed also between the rollers and the walls 42 and 44 of the chute or guide-way 36. This configuration makes it possible for the rolling action of the rollers to be in a direction that will produce a rolling action at all times with the chute and with the profiles of the teeth of the sprockets.

As indicated best in FIGURES 1A and 4, rollers 46 are adapted to ride in the base of the T-shaped chute, the sides of the base preventing axial displacement of the rollers. The diameter of the rollers 46 is sufficient to prevent the rollers from being displaced radially outwardly so that they would disengage the base of their T-shaped chute. The length of the rollers 40 is sufficient to prevent mislocation of the rollers in an axial direction.

If for some reason excessive tolerance should develop in the torque flow path defined by the rollers, the horizontal cross portion of the T-shaped chute for the rollers prevents excessive radial or transverse displacement of the rollers 48. It is impossible, therefore, for the rollers to assume a relative overcenter position regardless of the amount of tolerance that is present.

Having thus described a preferred embodiment of my invention, what I claim and desire to secure by United States Letters Patent is:

1. A roller drive comprising a driving shaft, a driven shaft, said shafts being adapted for rotation about parallel axes, a driving sprocket carried by said driving shaft, a driven sprocket carried by said driven shaft, a series of rollers, and a roller guide-way extending between said sprockets, said rollers being situated in said guide-way and arranged to establish a driving connection between said sprockets, said rollers comprising a series of pairs of rollers, one roller of each pair being longer than the other roller of that pair, the short roller of one pair engaging the long roller of the other pair, said guide-way comprising an inner roller guiding surface and an outer roller guiding surface, the inner roller guiding surface being engaged by the short rollers and the outer roller guiding surface being engaged by the longer rollers, said sprockets having roller engaging teeth that engage said longer rollers and impart rolling action thereto whereby motion is transmitted from one sprocket to the other with a relatively friction free motion.

2. The combination as set forth in claim 1 wherein the teeth of said sprockets are formed in two parts extending radially outwardly, each part having a conjugate tooth profile, the profile of said teeth engaging the ends of the longer rollers, the shorter rollers being situated between the tooth parts as motion is imparted thereto by the longer rollers.

3. The combination as set forth in claim 2 wherein the longer rollers are of smaller diameter than the shorter rollers.

4. The combination as set forth in claim 3 wherein the axial ends of the smaller rollers are tapered, the conjugate teeth of said sprockets engaging the tapered ends of said smaller rollers.

5. The combination as set forth in claim 1 wherein the longer rollers are of smaller diameter than the shorter rollers.

6. The combination as set forth in claim 5 wherein the axial ends of the smaller rollers are tapered, the conjugate teeth of said sprockets engaging the tapered ends of said smaller rollers.

References Cited

UNITED STATES PATENTS

| | | | |
|---|---|---|---|
| 2,869,377 | 1/1959 | Pieterse | 74—216.3 |
| 2,901,914 | 9/1959 | Preston | 74—216.3 |
| 2,973,671 | 3/1961 | Elkins. | |

JAMES A. WONG, Primary Examiner